April 13, 1965  R. N. BAYLOR ETAL  3,177,811
COMPOSITE HEAT-RESISTANT CONSTRUCTION
Filed Oct. 17, 1960  2 Sheets-Sheet 1
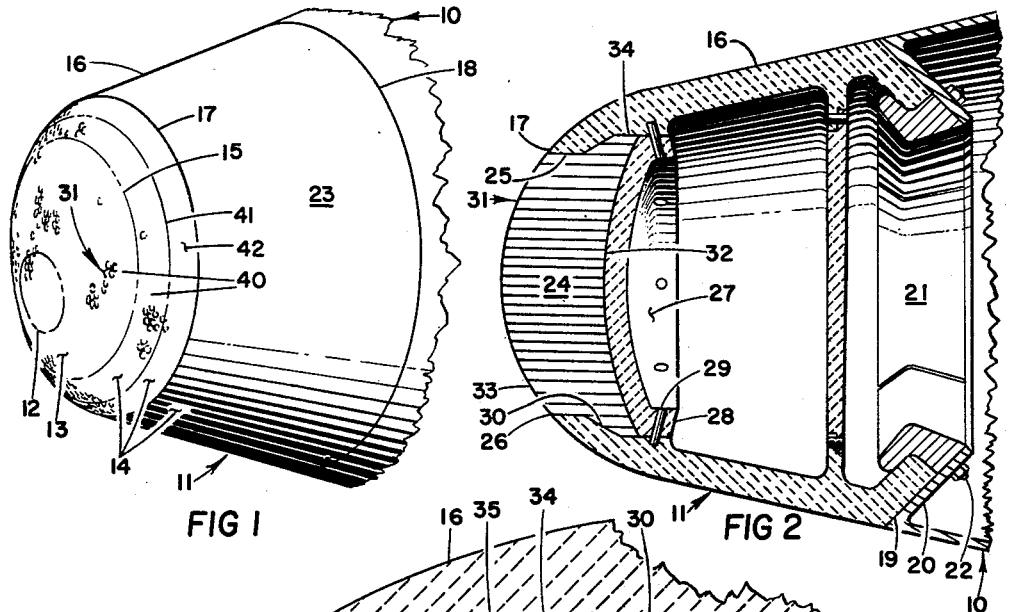
FIG 1
FIG 2
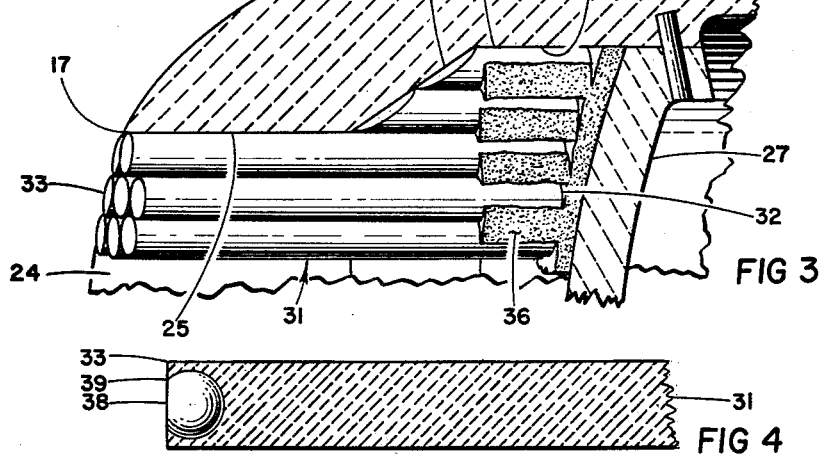
FIG 3
FIG 4
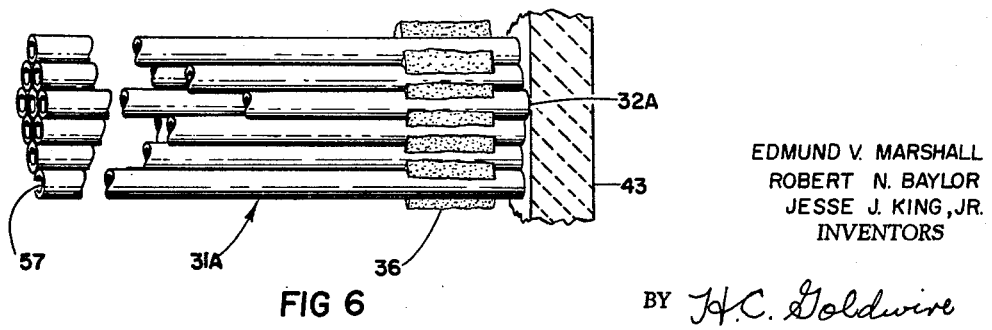
FIG 6
EDMUND V. MARSHALL
ROBERT N. BAYLOR
JESSE J. KING, JR.
INVENTORS
BY H.C. Goldwire
AGENT

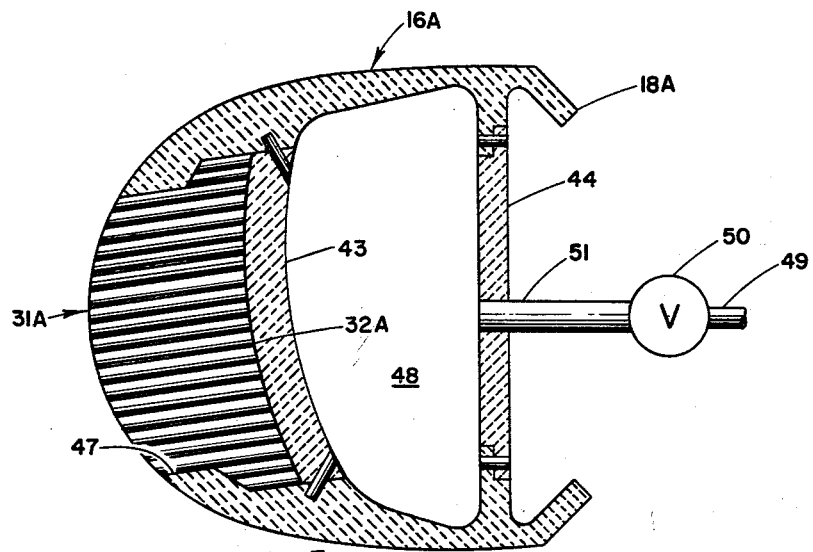
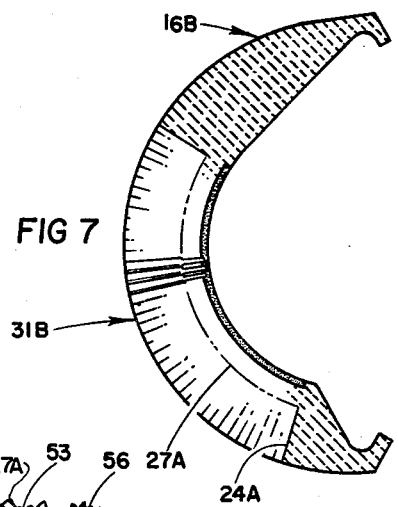
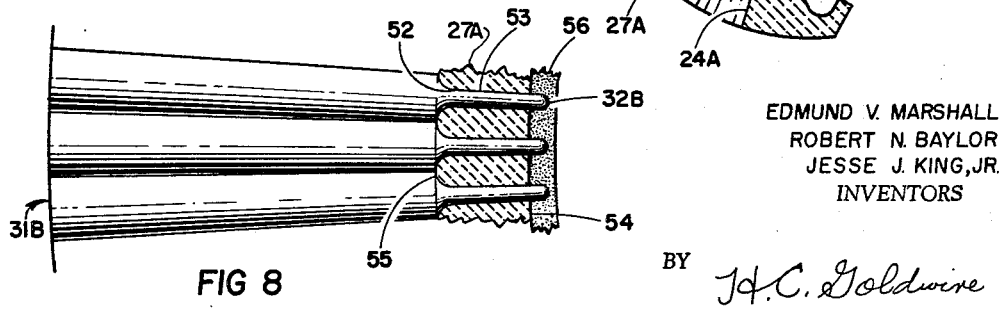
EDMUND V. MARSHALL
ROBERT N. BAYLOR
JESSE J. KING, JR.
INVENTORS
BY J.H.C. Goldwire
AGENT

United States Patent Office 3,177,811
Patented Apr. 13, 1965

3,177,811
COMPOSITE HEAT-RESISTANT CONSTRUCTION
Robert N. Baylor, Jesse J. King, Jr., and Edmund V. Marshall, Dallas, Tex., assignors, by mesne assignments, to Ling-Temco-Vought, Inc., Dallas, Tex., a corporation of Delaware
Filed Oct. 17, 1960, Ser. No. 62,931
20 Claims. (Cl. 102—92.5)

This invention relates to heat-resistant constructions and more particularly to a construction of prime utility as the leading portion of a nose, wing, or the like of a very high-speed flight vehicle intended for atmospheric passage at speeds up to or exceeding orbital velocity.

The problems of extreme and destructive heating of maneuverable vehicles during their very rapid passage through the atmosphere have become crucial and heretofore have not been afforded a satisfactory solution. Aerodynamic heating becomes critical in extreme-velocity, low altitude flight vehicles and is increasingly a limiting factor in the cases of boost-glide vehicles, vehicles moving approximately at orbital velocity at the initiation of atmospheric entry, and lunar return vehicles. All these, especially at the leading areas of their exposed surfaces, must withstand extreme temperatures for relatively long time periods. Thus, whereas in a typical boost-glide vehicle a fuselage panel must withstand temperatures of the order of 3,000° F., stagnation regions of the wing leading edge reach approximately 3,200° F., while the nose cap must withstand 4,000° F. or above; and the entry may consume 40 minutes or more from start to finish of significant aerodynamic heating.

Although they have been of great usefulness in vehicles with short entry times, ablation and heat-sink materials by no means present complete and satisfactory solutions to the heating problems of a maneuverable vehicle which travels for long time periods through the atmosphere at speeds resulting in temperatures of the order and duration mentioned above. The principal difficulty in use of these materials centers about the prohibitively great weight and bulk of either of them if employed in quantity sufficient for effecting the needed cooling for the necessary time-period. Further, an ablation material changes its shape during and because of its operation and thus results in added problems of changes in weight and balance and in the aerodynamic characteristics of the vehicle. Further, where entry time is long and a large heat pulse is not soon encountered, a material which would be efficient as an ablation material in certain entry vehicles may lose its protective efficiency in failing to vaporize and thus may merely absorb and transmit to interior components of the vehicle the entry heat which it is intended to dissipate.

There is an outstanding need, then, for other than heat sink and ablation materials which may be employed to form the leading edges, nose tips, etc. of gliding entry vehicles and which will successfully withstand temperatures up to and including the stagnation temperatures which occur in such locations. Graphite has excellent resistance to thermal shock (a rapid and large change, negative or positive, in ambient conditions affecting the temperature of a local portion of a body and tending to result in a large temperature gradient in the body and destructive internal stresses). In addition, graphite has the advantage of high emissivity and is of favorable strength-to-weight ratio. Chemical treatment of graphite to produce a nitride-containing or siliconized surface layer is of benefit in increasing its heat resistance, but even following such treatment graphite tends to experience excessive damage from oxidation and erosion where flight conditions bring it above approximately 3,000° F. As a consequence, graphite is not suitable as the material of the wing leading edges of some vehicles and is of satisfactory usefulness in few, if any, gliding entry vehicles where employed in the leading area of the nose cap.

Attempts have been made to protect graphite, in stagnation areas, with ceramic coatings, tile layers, etc., but these have not previously proven satisfactory, especially in the stagnation area of a nose cap. Among difficulties experienced have been spalling, erosion, etc. in coatings and failures attending the loosening or loss of tiles. The large disparity in the expansion rates of ceramic tiles, coatings, etc. and graphite has contributed to these difficulties and still other serious problems. Much effort is being expended in the search for new protective materials and treatments which will enable bodies made of presently known refractory materials, including graphite, ceramics, and the refractory metals, to withstand the stagnation temperatures of atmospheric entry and slowing, but these efforts have been consistently attended by lack of success. It is highly desirable, therefore, to provide a construction which achieves the desired result, and it is especially desirable to do so while employing already known, currently available materials.

Refractory articles made of certain metallic oxides (herein designated "ceramics," whether or not made by baking) are relatively good heat insulators, have excellent resistance to erosion, and are not damaged by very high temperatures. Although displaying these highly favorable qualities, ceramics have other, quite unfavorable characteristics which heretofore have limited their usefulness for the leading areas of gliding entry and similar vehicles. A major disadvantage has lain in the high vulnerability of ceramic leading edges, nose caps, etc. to thermal shock; in addition, their emissivities are not as high as would be desired in certain cases, and their expansion rate tends to be too great to render them compatible with other materials in conjunction with which it would be desirable to use them. Further, where the temperature is sufficiently high, some ceramics tend to form a relatively low-melting eutectic compound by combination with another material, for example, graphite, on which it is mounted or otherwise is in contact.

It will therefore be understood that it is highly desirable to provide a construction which is suitable for the stagnation-heated and immediately downstream areas of gliding entry and similar vehicles and which construction employs presently available refractory materials in ways taking full advantage of their valuable attributes while negating and making ineffective the undesirable qualities which previously have limited their usefulness.

It is, accordingly, a major object of the present invention to provide, in an aerodynamic structure subject to stagnation heating, a construction able to withstand high temperatures, rapid temperature changes, erosion, and related conditions of a severity and duration up to and including that experienced by a glider-type vehicle during entry into and slowing within an atmosphere.

It is also a major object of the invention to provide, in a nose cone tip, a leading edge, or the like, a composite structure utilizing different materials in a manner wherein the desirable qualities of each are exploited and wherein the importance of their less desirable qualities to successful operation of the structure at sustained high temperatures and during times of rapid temperature change are greatly minimized.

Another object is to provide a structure, of this character, which is advantageously lighter in weight than would be a construction in which any known ablative or heat sink material is employed in quantity sufficient for the same purpose.

A further object is to provide a construction, of the above character, which employs readily available materials.

Yet another object is to provide a protective structure, for a stagnation area, which effectively limits the spread of heat away from the stagnation area and thus results in relatively low temperatures in structure near the stagnation area.

A still further object is to provide a construction suitable for the nose cone tip or a leading edge of an atmospheric entry or other very high speed lifting-wing aircraft and in which a ceramic is employed in a mode and manner obviating its tendency to fail under thermal shock and accompanying, extremely wide temperature gradients in the ceramic material.

Still another object is to provide, in a heat-resistant structure for use in and around a stagnation area, a construction employing a ceramic mounted in association with another material and in which construction the stresses imposed on the other material by thermal expansion of the ceramic are minimized.

An additional object is to provide means for supplying a cooling fluid flow over the exterior of a ceramic construction used in a stagnation area, the presence of which means concurrently adds, even in absence of the cooling flow, to the resistance of the ceramic construction to the injurious effects of extremely high temperatures and temperature changes.

Other objects and advantages will be apparent from the specification and claims and from the accompanying drawing illustrative of the invention.

In the drawing,

FIGURE 1 is a perspective view of an aerodynamic member, such as a fuselage forward end, having a nose cap embodying the invention;

FIGURE 2 is a longitudinal sectional view of the construction shown in FIGURE 1;

FIGURE 3 is an enlarged view showing some of the elongated members of FIGURE 2 together with the retaining means therefor;

FIGURE 4 is an enlarged, longitudinal sectional view of the forward end of an elongated member employed, for example, in the construction shown in FIGURES 1–3;

FIGURE 5 is a view similar to FIGURE 2 in which cooling provisions for the nose cap are shown;

FIGURE 6 is an enlarged view of elongated members typical of those shown in FIGURE 5 and showing in further detail their retaining means and relation with the nose cap floor;

FIGURE 7 is a longitudinal sectional view of a nosepiece in which the elongated members are tapered; and FIGURE 8 is an enlarged view showing retaining means typical of that employed in FIGURE 7.

With reference now to FIGURES 1 and 2, a flight vehicle has a member, in the example, a fuselage nose section 10 provided with a forward-end nosepiece 11. The exterior surface of the nosepiece 11 fairs smoothly with and forms a part of the aerodynamically contoured exterior surface of the nose section 10. During flight, a stagnation region occurs on the nosepiece forward portion as at 12, and this region may move about, depending on factors including angles of attack and yaw of the vehicle, anywhere within the leading area represented in the drawing as the area 13 within the phantom-line circle 15. While airspeed is high, as during atmospheric slowing from orbital velocity, the leading area 13 is subjected to extreme aerodynamic heating at the stagnation region 12 variably located within and confined to the leading area 13. A second area 14 begins immediately downstream of the leading area 13 and is divided from the latter by the line 15. Since this second area 14 is not impinged upon by the stagnation region 12, it is cooler than the latter by an amount tending to increase with downstream distance from the leading area 13. The second area 14, as represented in the drawing, includes all the exterior surface of the nose section aft of the line 15 bounding the leading area 13.

While a fuselage nose section 10 and nosepiece 11 therefor is shown, by way of example, in the drawing, it will be understood that the present construction is applicable also to wing nose sections and other surfaces exposed to high temperatures and that FIGURE 2 and still other views of the drawing are intended to be representative of a longitudinal section throught he leading portion of a wing, stabilizing surface, etc. as well as through the nose section 10 shown in FIGURE 1. The term "leading area" is chosen as applying and with reference to a wing leading edge area, etc. within which a stagnation region may occur as well as to a corresponding area of a nose cap. The following description of a nose cap therefore is descriptive also of a wing leading portion, etc. employing the invention, and the term "nosepiece" is chosen as designating, and is intended so to designate, the forward portion, whether a separate piece or not, of any aerodynamically heated body.

The nosepiece 11 comprises a body 16 preferably in the form of a hollow shell having a forward side 17 and an aft side 18. The aft side 18 abuts the forward side of the main body of the member 10 and is rigidly mounted on the latter as by, for example, an inwardly formed peripheral flange 19 on the aft side of the body which mates with a peripheral, internal flange 20 at the front of the nose section portion 10 on which the nosepiece 11 is mounted. Attachment is effected by means such as a retainer ring 21 which bears against the forward face of the nosepiece flange 19 and is held firmly footed on the nose section flange 20 by welding or appropriate fastening means 22. The retainer ring 21 is made in two or more segments to allow its insertion into the hollow shell 16.

The shell 16 has an exterior surface 23 which extends between its forward and aft sides 17, 18 and forms its lateral sides. The shell surface 23 preferably blends smoothly with the contour of the nose section 10, and all of it lies in the second area 14, i.e., outside the area 13 in any part of which the stagnation region 12 may occur. The shell 16 is made of a refractory material, this term being employed herein to designate any solid material especially resistant to heat. Exemplary materials employable in the shell 16 are the refractory metals (tungsten, molybdenum, columbium, etc.), ceramics, and graphite. Since graphite has advantages which in many cases render it especially desirable in this capacity, it is chosen for employment in the specific example. A preferred material is a molded, premium quality graphite which is extremely fine grained, of high strength, virtually free of flaws, and of high bulk density. Material of this type is currently supplied by, for example, the National Carbon Company, New York 17, N.Y., under their designation of "Grade ATJ" graphite. Surface oxidation of the graphite shell 16 is greatly minimized by siliconizing its surfaces to form thereat a layer containing silicon carbide. Siliconized graphite of the desired grade may be obtained from the source noted above; another source is the Minnesota Mining and Manufacturing Company of St. Paul, Minnesota.

The shell or body 16 has a forward-end recess or cavity 24 whose sidewall 25 is formed by material of the body 16 extending peripherally of the cavity 24. The cavity 24 has an opening 26 in the forward end of the body 16. Extending generally transversely of the body 16, a plate 27 of refractory material, preferably of the same material as the body 16, is rearwardly spaced from the opening and forms the cavity floor. While made, if desired, integrally with the shell 16, the floor 27 conveniently is made in a separate piece which has a rearwardly directed peripheral flange 28 fitting snugly in the bore of the shell 16. Attachment of the floor 27 to the shell 16 is rigidly effected by, for example, graphite pins 29 which pierce the flange 28 and extend into the shell 16. The embodiment shown in FIGURES 1 and 2 employs a peripheral recess 30 extending partly or (preferably) all around the cavity at the floor and in the sidewall 25. The purpose of this recess 30 will become evident in later paragraphs.

Closely bundled with their sides in close line contact, a plurality of elongated members, preferably in the form of parallel rods 31, fill the cavity opening 26 and have inner ends 32 which preferably are slightly spaced from the front side of the floor 27 and outer ends 33 which are shaped, as by grinding after assembly of the nosepiece 11, to form collectively a rounded, aerodynamic surface including the leading area 13 and an annular margin thereabout. The peripheral ones of the rods 31 lie in close contact with the cavity sidewall 25. Made of a refractory material which to a satisfactory degree withstands fusion, oxidation, and erosion under stagnation temperatures, the rods 31 preferably are ceramic and are rounded, preferably circular, in cross-section. Zirconia is especially desirable for this purpose, and an example of a formulation of the rod materials which has given excellent results is as follows: $ZrO_2$, 93.3%; $SiO_2$, 0.7%; CaO, 5%; $Fe_2O_3$, 0.2%; $Al_2O_3$, 0.5%; $TiO_2$, 0.3%. Rods 31 made of the above materials are fabricated by extrusion or molding. The specific formulation employed, of course, will be determined by the operating conditions. For example, for withstanding the most severe environmental conditions under which the device will be expected to operate, the above formulation preferably is varied in a manner resulting in partial rather than substantially full stabilization of the zirconia and in close control of impurities present. The degree of stabilization, as will be known to those versed in the art, may be diminished by decreasing the amount of calcium oxide present in the material of the rods 31. Two suppliers of zirconia rods are the Zirconium Corporation of America, Solon, Ohio, and the Norton Company, Worcester 6, Massachusetts.

In size, the rods are relatively small; rods of ⅛-inch diameter have been employed with excellent results, although somewhat larger or smaller rods are satisfactory. Since the locations of the rod forward (outer) ends 33 is determined by the desired aerodynamic shape which they jointly establish, the location of the floor 27 is established as that which provides for at least the proper length of extension of the rods 31 into the shell. The rods 31 are longer in locations where their outer ends are exposed to greatest heat; assuming that the time-periods during which the stagnation region 12 occupies different areas within the leading area 13, and its temperatures during those time-periods, are such as to produce greatest heating effects at the center of the area occupied by the rod outer ends 33, then the rods 31 must be made longest in this area and preferably are shorter in other areas, their length always being great enough to prevent heat-conductance along the length of the rods from raising them, at their inner ends 32, to temperatures high enough to be accompanied by damages to the floor 27 or the rod fastening means (to be described). The minimum rod length thus must be set, in each location, in accordance with the heat conductivity of the rods 31 (favorably low where ceramic rods are employed) and the heat resistivity of the specific materials of the floor 27 and fastening means. In one successful application in which zirconia rods 31 are employed in a graphite shell 16, the rods range approximately from one to four inches in length and are ⅛-inch in diameter. While shorter lengths and greater diameters are acceptable, no rod 31, in the embodiment shown in FIGURE 2, should be shorter than approximately three times its diameter, while the diameter should be less than that at which the maximum thermal gradient across the exposed rod outer end 33 will impose critical thermal stresses in the rod. It will thus be seen that relatively large-diameter rods, up to or over ½-inch, may be employed where the radius of the leading area 13 is large, since temperatures will vary less widely from a given point in or near the stagnation region 12 to another point separated from the first by a given interval. On the other hand, temperatures between two points separated by the same, given interval will tend to vary more widely in most regions of a leading area of smaller radius; consequently, a smaller-diameter rod must be employed.

The means securing the elongated members 31 in the cavity 24 serve to attach the elongated members rigidly to each other and to the body 16 at their bases while leaving them free for independent expansion in length at their outer ends 33. For this purpose, a second plurality of rods 34 (FIGURES 2, 3) is provided peripherally of the bundle of rods 31 filling the cavity opening 26. These additional rods 34 lie in and fill the recess 30 in the cavity 24 near or at the floor 27; their forward ends 35 abut the forward wall of the recess. All the rods 31, 34 are fastened together in the region of their inner ends by a cement 36 which, in addition, forms a pad between the rod ends and the floor and together with the latter prevents rearward motion of the rods 31, 34. By virtue of the cement 36, the rods 31, 34 are all bound together and act, at their inner ends, as a solid unit; consequently, forward motion of any or all the rods 31, 34 at their inner ends is prevented by interference of the forward ends 37 of the peripheral, recess-filling rods 34 with the forward wall of the recess 30. Meanwhile, it is of importance that each rod 31 is free to expand axially, in complete independence of the other rods, at its outer end.

The cement 36 must withstand heat transmitted thereto by the rods 31 and has as its major constituent a material identical with or having properties similar to the material of the rods 31, 34. Thus, where zirconia rods 31 are employed, a zirconia cement is desirable.

As mentioned above, the cement 36 should approach the composition and properties of the particular rods 31 with which they are employed and preferably should depart therefrom only to the extent manadatory for endowing the cement with characteristics facilitating its application and curing. It should be chemically compatible with the materials of the rods 31 and shell 16 and not undergo appreciable chemical reaction with them at operating temperatures. Where the rods 31 are zirconia, the cement 36 accordingly, to provide a preferred example, is composed of zirconia whose change of volume with temperature is stabilized by a suitable agent such as calcium oxide or yttria to approach or attain a full degree of stabilization for minimizing, as in the rods 31, thermal shock behavior. The cement 36 also includes a suitable binder such as phosphoric acid. Representative suppliers of such cements are those noted above in connection with the rods 31.

The rods 31 employed in the above-described construction are, as shown in FIGURE 3, of solid form, although the hollow rods later described in connection with FIGURE 6 may be employed. Where the emissivity of the rod material does not provide sufficient return of aerodynamically induced thermal energy to the environment, the emissivity is believed to be improved by employing the hollow rods in that the hollow interior acts, at the rod outer ends, as an emissive "black hole."

The invention further provides, for improved emissivity, the rod construction shown in FIGURE 4 wherein a solid rod 31 has in its outer end 33 an open, forwardly facing cavity which is short relative to the total length of the rod and which is filled with a highly emissive material 38 such as plain or tinted quartz. For maximum heat transfer from the rod to the quartz, the cavity containing the quartz 38 preferably is spheroidal in shape. Its opening 39 must be small enough to prevent, in view of the viscosity and surface tension of the emissive material 38, the excessive loss of the latter from the cavity at high temperatures. Although any material is suitable which is heat-resistant, chemically inert, and (if molten at operating temperatures) of desirable surface tension, viscosity, and emissivity, the preferred material, as noted above, is quartz. Emissivity of the quartz 38 is improved by permanently tinting it a darker color by admixing cobalt or the like into the quartz while the latter is molten. The tinted quartz 38 is formed into a sphere of less diameter than the rod 31, the latter being fabricated with the sphere in its end. The rod end and adjoining side of the quartz sphere 38 then are ground to provide the rod-end opening 39 and expose the quartz. Alternatively, the quartz 38 is melted and injected into the cavity through the opening 39.

The surface formed by the exposed rod outer ends 33 should, in all cases, include all of the leading area 13 since the stagnation region 12 is restricted to but can move about within and directly affect each part of that area. The second area 14 has regions far enough removed from the leading area 13 to be below a temperature excessively injurious to the material, e.g. graphite, of the shell 16, and the forward edge 17 of the shell lies within such a region. The surface between the shell forward edge 17 and the imaginary line 15 enclosing the leading area 13 therefore is formed by rod outer ends additional to and surrounding those forming the leading area 13.

Cases occur in which both of a given pair of materials can successfully withstand a given high temperature as long as they are separated but, when placed in contact with each other, combine to form a lower-melting material or eutectic where they are in contact. As a result, melting occurs, at the given temperature, in the region of contact. This, then, is another consideration establishing the size of the area provided by the outer ends of the rods 31. Where the rod material 31 is, for example, a ceramic subject to eutectic formation with, for instance, a graphite shell 16, the nosepiece may conceivably operate at such temperatures that there is a given area, at least in part coextensive with the leading area 13 (FIGURE 1) since the latter is stagnation-heated, in which a eutectic would be formed if the ceramic 31 and graphite 16 were in contact. This given area 40, as shown in FIGURE 1, in some cases will include all of and in addition may extend peripherally around and outside the leading area 13, being rearwardly bounded, in the example, by the line 41. The line 41, then, marks the boundary forward of which temperatures are high enough for eutectic formation between the graphite 16 and ceramic 31 and downstream of which the exterior surface is below such temperatures. The forward edge 17 of the graphite body 16 is placed in a still cooler location downstream of this line 41. Surrounding the given area 40 hot enough for eutectic formation, then, is another area 42 provided by outer ends 33 of the rods too far removed from the stagnation region 12 to experience eutectic-forming temperatures. It is with these cooler rods forming the area 42 that the graphite body 16 is in contact, and hence the danger of eutectic formation is obviated.

With reference now to FIGURE 5, a modification of the invention employs a shell 16A similar to the shell 16 shown in FIGURE 1. The cavity floor is formed of a porous, heat-resistant material forming a transverse partition 43 which is intermediate the shell forward opening 26 and a wall 44 which extends transversely of the shell 16A and closes off its interior at its aft side 18A. The partition 43 thus divides the shell interior into a forward chamber 47 adjacent the shell forward opening 26 and a plenum chamber 48 between the partition 43 and the wall 44. For reasons which will become apparent, the partition 43 is tapered in thickness, with its thickest portions adjacent the shell and its minimum thickness at its center. A preferred material for the partition 43 is porous graphite.

The elongated members 31A fill the shell forward opening as before and are similarly attached in the forward chamber or cavity 47 with the exception that each rod 31A closely abuts the forward face of the partition 43 and, as shown in FIGURE 6, its extreme inner end 32A is kept free of the attaching means cement 36. Each rod 31A has a bore 57 (FIGURE 6) which renders it hollow throughout its length, and the interstices between the rods 31A are sealed by the cement 36. It will be understood that the drawing is not to scale, and the bores 57 are shown in exaggerated relative size.

A source of fluid, for instance a tube 49 (FIGURE 5) leading from a pump or a supply of fluid under pressure (not shown), leads to a valve 50 positionable for supplying fluid flow into the plenum chamber 48 through a tube 51 leading into the latter from the valve. The fluid used may be water or helium or other liquid or gas. Where a gas is employed, helium is preferred, for example, for its inertness and consequent lack of tendency to combine with the shell 16, rods 31, or other components.

While the constructions shown in FIGURES 2 and 5 provide great weight savings over ablative and heat-sink devices yielding equivalent protection, the construction shown in FIGURES 7 and 8 is still lighter and therefore especially useful where minimum weight is a prime consideration. This construction, including as one of its features an alternative and highly reliable rod fastening means, may be employed on relatively blunt nose sections, such as those shown in FIGURES 2 and 3, or even on a flat surface; yet, as will be seen, it is of such versatility as to be especially adaptable for use on surfaces with curvature of relatively short radius. Because the rods 31B are radially aligned rather than always parallel, the curvature of a surface formed by the rod outer ends may extend through as large an angle as desired, and the construction therefore is very satisfactory as the protective means for the leading edge region (and any other desired area) of a wing, etc. As shown in FIGURE 7, all the forward surface of the nose section subject to direct impact with the airstream is readily formed by the outer ends of the rods 31B, thus rendering the graphite supporting shell 16B (no longer subject to direct air-stream impact) much less subject to possibly severe erosion.

When the rods 31B are cut or ground to provide the desired exterior surface contour at their outer ends, it is preferable that each have an outer end face approximately normal to its axis. Otherwise stated, the axis of each rod 31B is preferably normal to the exterior surface. Where the surface formed is flat, the rods 31B are cylindrical; to preserve the desired line contacts between them along their sides, the rods 31B are tapered where the surface formed by their outer ends is curved. Thus, to form the convex exterior surface shown in FIGURES 7 and 8, the rods 31B are tapered, with their inner ends being the smaller.

While they may be fastened in the forward-end recess 24A of a body 16B as previously described, an alternative fastening means (also useful in the forms shown in FIGURES 1-4) is shown in detail in FIGURE 8. The floor 27A is provided with a plurality of holes 52 extending between its front and back faces, each hole being aligned with the axis of a respective rod 31B. The end of each rod 31B, preferably reduced in diameter at its inner end portion to form a tang or shank 53, is inserted into its respective hole 52 through the floor 27A until the shank 53 extends rearwardly from the rear face 54 of the floor. The main body of the rod 31B preferably bottoms against the floor forward face 55, and the shank 53 fits snugly in its respective hole 52.

The rods 31B are held in the above-described position by applying to each a body which is rigidly attached to its rear end 32B and which bears against the floor rear face 54. This is accomplished by the use of mechanical fasteners, by applying the previously described or an equivalent cement, or by flame-spraying the end of each rod 31B with a refractory material of suitable heat resistance. The spray or cement preferably builds up a layer or body 56 on the floor rear face 54 which surrounds and fastens all the rod shanks 53. The term "flame-spraying" as employed herein does not necessarily imply the use of an actual flame but is intended to designate, and where employed does designate herein, any method whereby zirconia or the like is applied by spraying while in a finely divided, molten state.

By virtue of their tapered form where their axes intersect a curved exterior surface (and, as will be seen, because of advantages offered by the fastening means employed), the main bodies of the rods 31B need be no longer, if desired, than is required for thermal protection of the floor 27A and hence permit a relatively very lightweight construction.

When the vehicle moves at very high airspeeds, as upon gliding entry into the atmosphere, the vehicle exterior surface is subjected to great aerodynamic heating. This is most severe in stagnation regions such as the region 12 (FIGURE 1), and is less severe immediately downstream therefrom by a degree tending to vary with distance from the stagnation region. The outer ends of the refractory rods 31, those in the preferred example being constructed of zirconia, readily withstand the stagnation temperatures (which in a representative design for a gliding entry vehicle range around 4,000° F.) without oxidation, excessive melting, or erosion. Such performance would be expected of this ceramic because of its known properties. Previous experience, however, with ceramic leading-area bodies, where solid, would lead to the expectation that the ceramic body would crack and spall because of thermal gradients from point to point in the body. These gradients arise from thermal shock and also from thermal differences which exist across the exterior surface of the nosepiece formed by the outer ends of the rods even when rate of temperature change, at any given point, is negligible. Because of their relatively small diameters, however, the distance between the most widely separated points in a given rod outer end 33, hence the temperature difference between those points, is quite small and does not set up thermal stresses of magnitude sufficient to fracture the rod 31. Each rod 31 is free for independent axial expansion at its outer end; therefore, no rod 31 imposes, because of a temperature difference between itself and adjoining rods, any axial stresses on any other rod 31 and, because of the insulative qualities of the rods 31, temperatures are not nearly so high at their inner ends 32 as at their outer ends 33. The rods 31 and the cement 36 binding them together at their inner ends 32 act, at the rod inner ends, as an integral unit wherein the rods 31 have no tendency for motion relative to each other or the shell 16. As a result of the relatively low temperature of the rods 31 at their inner ends 32, they and their cement 36 do not tend to raise the temperature of the floor 27 and the portions of the shell 16 with which they are in contact sufficiently to cause oxidation or other damage.

Large aerodynamic forces, of course, are imposed on the nosepiece 11 in addition to the heating. Because of the relatively small size, large number, and line contacts between the rods 31, laterally directed forces are distributed among them and uniformly applied to the graphite body 16. In the case of axially directed components of air loads, the difference in air loads on adjacent rods 31 is small because of their relatively small diameters. The forces which adjacent rods 31 individually impose on the cement 36 and floor 27, consequently, are virtually the same. Stress gradients imposed on the cement 36 and floor 27 by airloads on the rods 31 therefore are small, and variations in stress tend to be smooth as measured from point to point across the diameter of the floor. Protected by the rods 31, the relatively cool floor 27 bears these loads easily and passes them on, through the shell 16, into the remainder of the aircraft.

The extreme temperatures of the stagnation region 12 and adjacent areas being borne by the rods 31, the temperatures to which the graphite shell 16 is subjected are well within the ability of the latter to withstand, and the shell endures none of the damage it otherwise would sustain were the stagnation temperatures imposed upon it. Conduction of heat from the stagnation area 12 to the shell 16 and its floor 27 is minimized, both laterally and axially, by the insulative qualities of the ceramic rods 31, and the spread of heat from the stagnation area thus is limited and minimized.

Snugly filling the cavity opening 26, the rods 31 form at their outer ends 33 an aerodynamic surface which is readily shaped to blend smoothly with the exterior surface of the refractory body 16 which, in the preferred example, is graphite. Since the rate of expansion of ceramics (including zirconia, preferred for the rods 31) with increase in temperature is greater than that of graphite, a solid ceramic insert would expand much more rapidly than the graphite shell and impose stresses on the latter which conceivably would precipitate its fracture. This undesired result does not occur, however, in the present construction, for individual diametric expansion of each rod 31 results in a degree of deformation of the same at its line contacts with the other rods 31 rather than over-all diametric expansion of the bundle of rods 31 as a whole, and the result is a large apparent reduction in the expansion rate of the ceramic material of which the rods 31 are made. As a consequence, the stresses induced by the rods 31 in the graphite 16 are greatly minimized and are below those which would fracture the graphite body 16. At the same time, since the cooler inner ends 32 of the rods are positionally stable relative to the graphite body 16 while the outer ends 33 undergo independent axial expansion, there is no tendency for the material forming the forward surface of the nosepiece to buckle, spall, delaminate, etc.

While the above operations and results have been described in connection with FIGURES 1–3, they are also generally applicable to the remaining details of construction shown in the other figures of the drawing. With particular reference to FIGURES 5 and 6, however, it will be noted that the flow of fluid into the plenum chamber 48 and out of the latter through the porous partition 43 continues through the bores 57 of the hollow rods 31A and into the boundary layer through the rod outer ends, thus cooling the perforated surface jointly provided by the outer ends of the rods 31A. To the extent that the "black hole" presented by the hollow outer end of each rod 31A improves its emissivity, the construction of FIGURE 5 tends to add to the temperature resistancy of the nosepiece 16A even in absence of the cooling fluid, as does the emissive material 38 provided in the rod outer ends 33 as in FIGURE 4. The variations in thickness of the partition 43 (FIGURE 5) serve to vary locally its resistance to flow of the fluid through it and into the rods 31A. The partition 43 is thinnest in the region, say its center, abutted by the rods 31A through which it is desired to pass the greatest flow of fluid and is thicker in other regions in accordance with the desired diminution of the fluid flow. The partition 43 thus functions as a metering means for the cooling fluid.

While readily providing a construction in which the exterior surface formed by the outer ends of the rods 31B efficiently extends throughout a greater range of curvature than in the other figures of the drawing, the construction shown in FIGURES 7 and 8 allows for a shorter rod length and thus a still lighter construction. The shanks 53 of the ceramic rods 31B fit snugly in the floor holes 52, and their thermal expansion rate is greater than that of the graphite in which the holes 52 are formed. As a consequence, advantage is taken of the disparity between the thermal expansion rates of ceramics and graphite, for heating tends merely to tighten the shanks 53 and increase the security of their mounting in the holes 52. The ceramic or cement 56 attaching the rod rear ends 32B is behind the floor 56 and hence well protected from heat; consequently, an excellent bond between itself and the shanks 53 is maintained even where its contact is with only a short length of each shank. As no grip length between the rod 31B and fastening material 56 is needed forwardly of the floor, the main body of each rod need be of no more length than that needed for thermal protection.

While the invention has been described, to provide a specific example, in terms of its application to the leading areas and areas contiguous thereto on flight vehicles, it will be understood that the usefulness of the invention is not limited to the specific examples provided and that the construction taught herein is of excellent utility wherever required for providing high resistance and immunity to extreme heating. Further, the invention is not restricted to employment exteriorly of a flight vehicle or even to flight vehicles per se but may be employed, for example, in the heat-protective lining of a passage or vessel whether or not a part of a flight vehicle. It will be apparent, therefore, that the terms "inner" and "outer" as applied to the ends of the rods have reference to the relationship of those ends to the body on which or relative to which they are fixedly mounted. Thus, while the inner ends always are disposed adjacent this body, the outer ends actually are turned inwardly relative to the over-all structure of which the heat-protective device is a component in those cases where the heat to be protected from originates interiorly of that structure and are turned outwardly where the heat originates exteriorly of the structure.

Thus, while only one embodiment of the invention has been described in detail herein and shown in the drawing, together with several modifications thereof, it will be evident that various further modifications are possible in the arrangement and construction of the components of the composite heat resistant body without departing from the scope of the invention.

We claim:

1. A nosepiece forming a forward part of a flight vehicle member having an aerodynamically contoured exterior surface including a leading area subject to great aerodynamic heating, during flight, from a stagnation region which occurs within said leading area and further including a second area immediately downstream of the leading area and outside the stagnation region, said nosepiece comprising: a refractory body forwardly mounted on the member, said body having forward and aft sides and an exterior surface extending therebetween and lying within said second area and outside the leading area, the body being provided, in its forward side, with a cavity having a forward opening; a plurality of elongated, refractory members bundled in close, mutually contacting relation and inserted in said cavity, the elongated members having inner and outer ends and filling the cavity opening, the outer ends together forming a surface including said leading area; and means securing the elongated members in the cavity.

2. The nosepiece recited in claim 1, the elongated members being free to expand in length at their outer ends.

3. The nosepiece recited in claim 1, the elongated members being of rounded cross-sectional shape.

4. A nosepiece forming a forward part of a flight vehicle member having an aerodynamically contoured exterior surface including a leading area subject to great aerodynamic heating, during flight, from a stagnation region which occurs within said leading area and further including a second area immediately downstream of the leading area and outside the stagnation region, said nosepiece comprising: a refractory body forwardly mounted on the member, said body having forward and aft sides and an exterior surface which extends therebetween and lies within the second area and outside the leading area; material of said body defining a cavity having sides, a floor, and an opening through the forward side of the body; a plurality of elongated, refractory members bundled in close, mutually contacting relation and inserted in said cavity, the elongated members having inner and outer ends and filling the cavity opening, the outer ends together forming a surface including said leading area; and means rigidly attaching the elongated members to each other and to the refractory body, the elongated members extending into the vicinity of said floor at their inner ends and being free to expand along their lengths at their outer ends.

5. The nosepiece set forth in claim 4, at least some of the elongated members being hollow at least at their outer ends.

6. A nosepiece forming a forward part of a flight vehicle member having an aerodynamically contoured exterior surface including a leading area subject to great aerodynamic heating, during flight, from a stagnation region which occurs within said leading area and further including a second area immediately downstream of the leading area and outside the stagnation region, said nosepiece comprising: a refractory body forwardly mounted on the member, said body having forward and aft sides and an exterior surface extending therebetween which surface lies within the second area and outside the leading area; material of said body forming a wall extending around the periphery of a cavity formed in said body and having an opening through the forward side of the latter; material of said body spaced from said opening and forming a floor in the cavity; a recess in said wall adjacent the floor and extending peripherally of the cavity; a first plurality of elongated, refractory members grouped in parallel, mutually contacting relation with each other and said wall and filling the cavity opening, said members having inner ends adjoining the floor and outer ends which together form a surface including said leading area; a second plurality of elongated, refractory members parallel with the first and closely filling the recess in said wall; and a cement attaching together the first and second pluralities of elongated members.

7. A nosepiece forming a forward part of a flight vehicle member having an aerodynamically contoured exterior surface including a leading area subject to great aerodynamic heating, during flight, from a stagnation region which occurs within said leading area and further including a second area immediately downstream of the leading area and outside the stagnation region, said nosepiece comprising: a refractory body forwardly mounted on the member, said body having forward and aft sides and an exterior surface extending therebetween and lying within said second area and outside the leading area, the body being provided, in its forward side, with a cavity having a forward opening; a plurality of elongated, refractory members bundled in close, mutually contacting relation and inserted in said cavity, the elongated members having inner and outer ends and filling the cavity opening, and the outer ends together forming a surface including said leading area; means securing the elongated members in the cavity; a given area of said surface formed by said outer ends which is at least in part coextensive with said leading area and subjected to flight temperatures at which said elongated elements if in contact with said body would form a eutectic; another area of said surface formed by said outer ends which surrounds said given area and is too far removed from the stagnation region to be subject to temperatures at which said elongated elements if in contact with said body would form a eutectic, the forward side of the refractory body being separated from said given area by said other area.

8. A nosepiece forming a forward part of a flight vehicle member having an aerodynamically contoured exterior surface including a leading area subject to great aerodynamic heating, during flight, from a stagnation region which occurs within said leading area and further including a second area immediately downstream of the leading area and outside the stagnation region, said nosepiece comprising: a refractory body forwardly mounted on the member, said body having forward and aft sides and an exterior surface extending therebetween which lies within said second area and outside the leading area and forms part of said exterior surface of said member, the body being provided, in its forward side, with a cavity having a forward opening; a plurality of refractory rods filling the cavity forward opening and having inner ends within the cavity, the rods being rounded in cross-section and tapered toward their inner ends and closely grouped together to provide close mutual contact between the sides of adjoining rods along substantially all their lengths, the outer ends of the rods being shaped to jointly form a rounded, aerodynamic surface including said leading area; and means securing the rods in the cavity.

9. A nosepiece forming a forward part of a flight vehicle member having an aerodynamically contoured exterior surface including a leading area subject to great aerodynamic heating, during flight, from a stagnation region which occurs within said leading area and further including a second area immediately downstream of the leading area and outside the stagnation region, said nosepiece comprising: a hollow shell made of a refractory material and having forward and aft sides, the shell being forwardly mounted on said member with its rear side in abutting relation with the latter and having an opening in its forward side; a wall extending transversely of the shell and closing off its interior in the region of its aft side; a transverse partition in the shell intermediate the transverse wall and the opening, said partition dividing the shell interior into a forward chamber adjacent the opening and a plenum chamber enclosed between the partition and wall; a source of a fluid; means for supplying a flow of the fluid into the plenum chamber and therefrom through the transverse partition, the latter being made of a porous, refractory material permeable by said fluid; a plurality of refractory rods hollow throughout their lengths and closely bundled so that their sides are in aligned, closely contacting relation with each other, the rods having inner ends abutting the transverse partition and receiving said fluid flow and further having outer ends which jointly form a perforated surface including said leading area, the rods entirely filling the opening in the forward side of the shell; and means securing the rods in abutting relation with the transverse partition, said means including a cement sealing between the rods, the latter being free of the cement at their inner and outer ends.

10. The nosepiece set forth in claim 9, the transverse partition being of tapered thickness, with maximum thickness adjacent the shell and minimum thickness in the region of its center.

11. A nosepiece forming a forward part of a flight vehicle member having an aerodynamically contoured exterior surface including a leading area subject to great aerodynamic heating, during flight, from a stagnation region which occurs within said leading area and further including a second area immediately downstream of the leading area and outside the stagnation region, said nosepiece comprising: a refractory body forwardly mounted on the member, said body having forward and aft sides and an exterior surface extending therebetween and lying within said second area and outside the leading area, the body being provided, in its forward side, with a cavity having a forward opening; a plurality of elongated, refractory members bundled in close, mutually contacting relation and inserted in said cavity, the elongated members having inner and outer ends and filling the cavity opening, the outer ends together forming a surface including said leading area; at least some of the elongated members each of which has an opening in its outer end and a cavity which is continuous with the opening and which is short in relation to the length of the elongated member; a meltable, inert, highly emissive material filling each cavity in each of at least some of the elongated members; and means retaining the elongated members in the cavity of the refractory body.

12. The nosepiece claimed in claim 11, the size of the outer-end openings in the elongated members being small enough in relation to the flow characteristics of the highly emissive material to substantially preclude loss of the highly emissive material, when the latter is molten, through the outer-end openings.

13. The nosepiece set forth in claim 11, the cavities in the outer ends of the elongated members being spheroidal in shape.

14. A nosepiece mounted on a flight vehicle member to form a forward part thereof, said member having an aerodynamically contoured exterior surface including a leading area subject to great aerodynamic heating, during flight, from a stagnation region which occurs within said leading area and further having a second area immediately downstream of and surrounding the leading area outside the stagnation region, said nosepiece comprising: a body made of a refractory material and having an exterior surface and a forward side; a recess in the forward side of the body; material of said body forming a floor in said recess, said floor having a front side contiguous with said recess and a back side removed from said recess; a plurality of refractory rods bundled in close, mutually contacting relation and mounted in said recess, the rods filling the recess; forward ends of the rods together forming a surface including said leading area; holes through the floor and extending between the front and back sides thereof; rear ends on the rods protruding rearwardly of the floor through said holes; and means retaining said rods in said cavity, said means including, at each of said rods, a body having rigid attachment to the rod rear ends and bearing against the back side of the floor.

15. A nosepiece mounted on a flight vehicle member to form a forward part thereof, said member having an aerodynamically contoured exterior surface including a leading area subject to great aerodynamic heating, during flight, from a stagnation region which occurs within said leading area and further having a second area immediately downstream of and surrounding the leading area outside the stagnation region, said nosepiece comprising: a body made of a refractory material and having an exterior surface and a forward side; a recess in the forward side of the body; material of said body forming a floor in said recess, said floor having a front side contiguous with said recess and a back side removed from said recess; a plurality of refractory rods bundled in close, mutually contacting relation and mounted in said recess, the rods filling the recess; forward ends on the rods together forming a surface including said leading area; holes through the floor and extending between the front and back sides thereof; rear ends on the rods protruding rearwardly of the floor through said holes; and a refractory material applied on the rear ends of the rods and having contact with the rear side of the floor.

16. The construction set forth in claim 15, said refractory material applied on the rear ends of the rods being a flame-sprayed ceramic.

17. A nosepiece mounted on a flight vehicle member to form a forward part thereof, said member having an aerodynamically contoured exterior surface including a leading area subject to great aerodynamic heating, during flight, from a stagnation region which occurs within said leading area and further having a second area immediately downstream of and surrounding the leading area outside the stagnation region, said nosepiece comprising: a body made of a refractory material and having an exterior surface and a forward side; a recess in the forward side of the body; material of said body forming a floor in said recess, said floor having a front side contiguous with said recess and a back side removed from said recess; a plurality of refractory rods bundled in close, mutually contacting relation and mounted in said recess, the rods filling the recess; forward ends on the rods together forming a surface including said leading area; holes through the floor and extending between the front and back sides thereof; and rear ends on the rods snugly filling, each of them, a respective one of the holes and protruding rearwardly from the floor, the material of said rear ends of the rods having a higher coefficient of thermal expansion than does the material of said floor.

18. The construction set forth in claim 17, said construction further including a body adherently affixed to the rear end of each of the rods and having contact with the rear side of the floor.

19. In combination with a base body having a surface area, means for protecting the base body from heat emanating from a heat source, said means comprising: a plurality of rods made of a ceramic material and closely grouped with their sides in mutually contacting relation, each of said rods having an inner and an outer end, the inner ends being grouped together adjacent the base body surface and the outer ends together forming a surface spaced from the base body surface and protectively disposed between the latter and the heat source; and means rigidly mounting the rods, in the region of their inner ends, in fixed relation to the base body.

20. The combination set forth in claim 19, the rod outer ends being free to slide axially along each other upon thermal expansion of the rods along their axes.

References Cited by the Examiner

UNITED STATES PATENTS

| | | | |
|---|---|---|---|
| 1,128,206 | 2/15 | Wiegand | 263—50 X |
| 2,376,227 | 5/45 | Brown | 102—5 |

BENJAMIN A. BORCHELT, *Primary Examiner.*

ARTHUR M. HORTON, *Examiner.*